United States Patent [19]

Chow et al.

[11] Patent Number: 4,698,718
[45] Date of Patent: Oct. 6, 1987

[54] ELECTRONIC REVERSE POWER RELAY

[75] Inventors: Kung C. Chow; Shan C. Sun, both of Coral Springs, Fla.

[73] Assignee: Westinghouse Electric Corp., Pittsburgh, Pa.

[21] Appl. No.: 802,131

[22] Filed: Nov. 26, 1985

[51] Int. Cl.[4] ............................................. F02H 3/38
[52] U.S. Cl. ........................................ 361/77; 361/82; 361/84
[58] Field of Search .................... 361/20, 21, 77, 82, 361/83, 84

[56] References Cited

U.S. PATENT DOCUMENTS 4,293,886 10/1981 Church et al. .................... 361/82 X
4,438,475 3/1984 Haley .................................... 361/82

FOREIGN PATENT DOCUMENTS 741415 6/1980 U.S.S.R. ............................... 361/84

OTHER PUBLICATIONS

"Applied Protective Relaying", published by Westinghouse Electric Corporation, 1979, pp. 6-12, 6-13.
Publications "I.L. 41-251.2M", published by Westinghouse Electric Corporation, Jul. 1985.

Primary Examiner—A. D. Pellinen
Assistant Examiner—Derek S. Jennings
Attorney, Agent, or Firm—G. H. Telfer

[57] ABSTRACT

An electronic protective relay which offers a very sensitive detection of a reverse power condition of a three-phase alternating current generator for the protection against generator motoring is disclosed. A current signal is generated from a current transformer coupled to one phase of the ac generator; and a voltage signal is generated from a potential transformer coupled across the one phase and another phase of the generator. A current input circuit is operative to maintain the phase angle between the voltage and current signals over a wide variation of input current, e.g. from one milliamp to 75 amperes. In addition, a phase-rectification type multiplier affords a relatively simple, but effective method for detecting the power flow direction of the generator. Once the power flow is determined to be in the reverse direction and above a preselected magnitude, a signal indicative of a potential generator motoring condition is geneated. Also included in the relay is an undervoltage detection circuit which operates to disable the generator motoring indication if the generator's voltage has not yet reached or has dropped below an adjustable undervoltage setting. Still further, the relay circuit includes timers in both the undervoltage and reverse power detection areas to insure that their respective conditions persist for a preset time duration in each case before an action is initiated.

10 Claims, 7 Drawing Figures

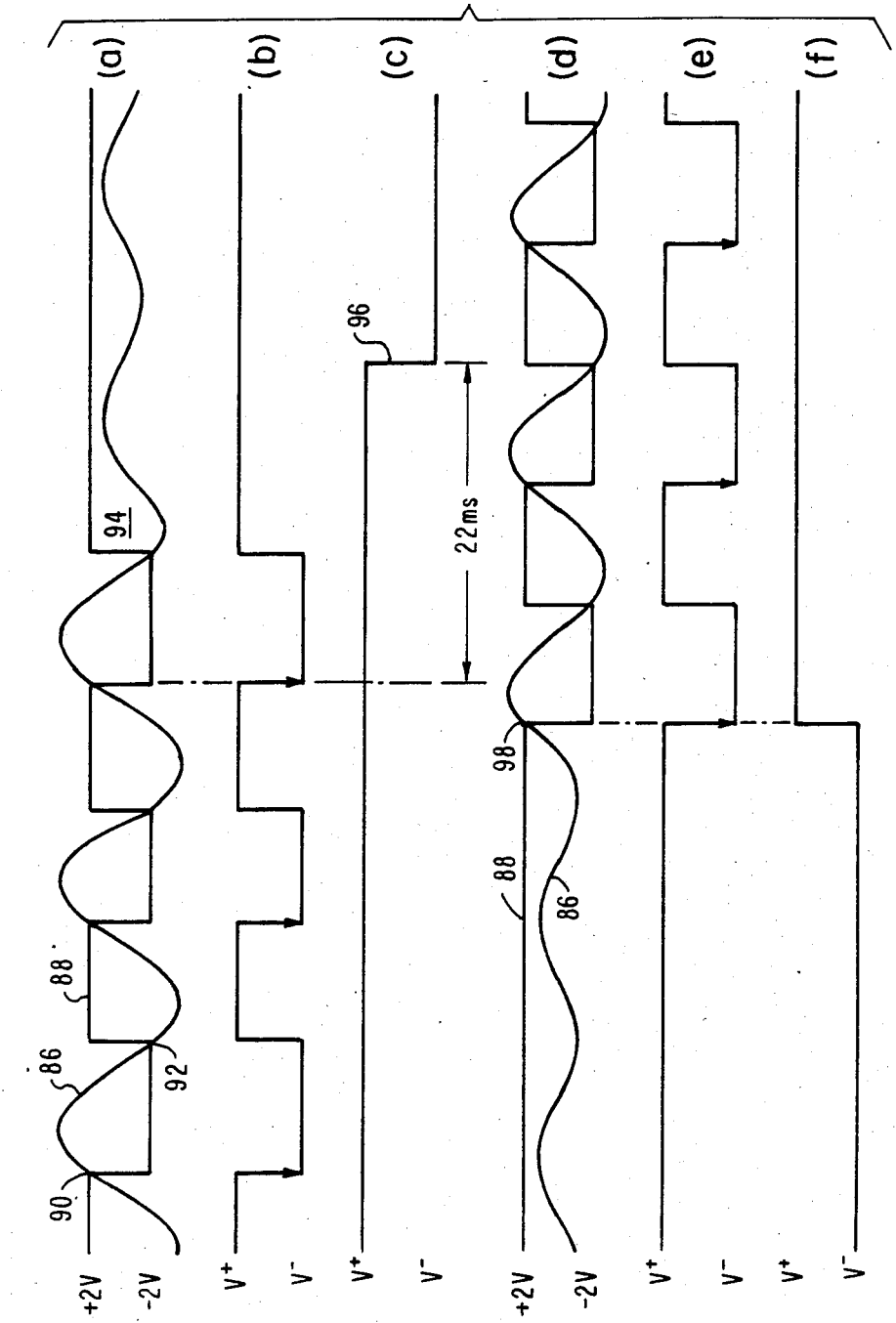

ELECTRONIC REVERSE POWER RELAY

BACKGROUND OF THE INVENTION

The present invention relates to protective relays in general, and more particularly, to an electronic relay for detecting a reverse power condition of a three-phase alternating current generator for the protection against generator motoring.

In a power system network which may be powered by at least one conventional turbine-generator set, for example, when the turbine drive of the generator cannot meet all of the losses of the set, the deficiency in real power is absorbed from the power system network into the generator, commonly referred to as a reverse power condition, causing the potential of generator motoring. Relays for protecting against generator motoring are normally designed to be extremely sensitive to respond to the first increment of reverse power so as to prevent the motoring condition. Reverse power, i.e. the real power being absorbed from the power system network into the generator, as small as 0.03% of the nameplate rating of the generator may be enough to cause motoring. Most, if not all relays, encounter difficulties in detecting reverse power of this magnitude and still carry continuous load current in the forward direction under normal conditions. For more information on protection against generator motoring, reference is hereby made to the Westinghouse publication "Applied Protective Relaying", 1979, pp. 6–12 and 6–13.

A typical anti-motoring or reverse power relay of the electro-mechanical type is the Westinghouse CRN-1 which is described in the Westinghouse publication I.L. 41-251.2M, July, 1985. The CRN-1 relay comprises a cylinder directional unit which detects the reverse power condition and controls the timing of an induction-disc voltage-timing unit. This relay has a sensitivity of 0.02 amp at rated nominal current of 5 amperes.

Recently, the sensitivity requirement for anti-motoring protection has been increased beyond that heretofore achieved; while, the requirement of withstanding current levels which may exceed fifteen times the rating (5 amperes) of a measuring current transformer, i.e. on the order of 75 amps, for example, was maintained. Applicants have met this challenge with an all-electronic protective relay embodiment purportedly capable of measuring line current as low as 0.02% of the normal current transformer's rating for a wide range of phase-to-phase voltage values and still withstand the aforementioned high current levels it may encounter in the forward direction.

SUMMARY OF THE INVENTION

In accordance with the present invention, an electronic protective relay including a plurality of circuits detects a reverse power condition of a three-phase alternating current (ac) generator for the protection against generator motoring. First and second circuits of the relay receive a signal representative of the current in one of the phases of the ac generator and a signal representative of a voltage at the output of the ac generator, respectively. The voltage signal has a phase relationship with the current signal. A third circuit phase shifts the voltage signal a first predetermined phase angle to effect a first signal representative thereof. A fourth circuit multiples the current signal by the first signal to generate a second signal having a component representative of the real power of the ac generator. Fifth and sixth circuits separate the real power component from the remainder of the second signal and detect a reverse power condition from the second signal component. Upon detection of a reverse power condition, a signal indicative thereof is generated.

More specifically, the ac generator produces power over three power lines, each carrying a different phase of the power. The first circuit receives a current representative signal from one of the phases, and the second circuit receives a signal representative of the voltage across the one phase and another phase.

Further, the electronic relay includes an undervoltage detect circuit for detecting an undervoltage condition of the voltage signal and for generating a signal indicative a trip signal in response to the also included for generating a trip signal in response to the reverse power condition signal. The logic circuit is disabled by the undervoltage signal from generating the trip signal. Still further, the first circuit includes an amplitude limiting circuit for limiting the amplitude of the current signal to a predetermined amplitude without altering substantially the phase relationship between the current and voltage signals. Still futher, a timer circuit, disposed between the sixth circuit and logic circuit, generates a delayed signal if the reverse power condition signal is sustained for a predetermined time interval which is initiated by the generation of the reverse power condition signal. The logic circuit is responsive to the delayed signal to generate the trip signal unless disabled by the undervoltage signal.

BRIEF DESCRIPTION OF THE DRAWINGS

FIG. 6 including the waveforms a-f illustrates the operation of the undervoltage detect circuit depicted in FIG. 5;

DESCRIPTION OF THE PREFERRED EMBODIMENT

Figure 1:
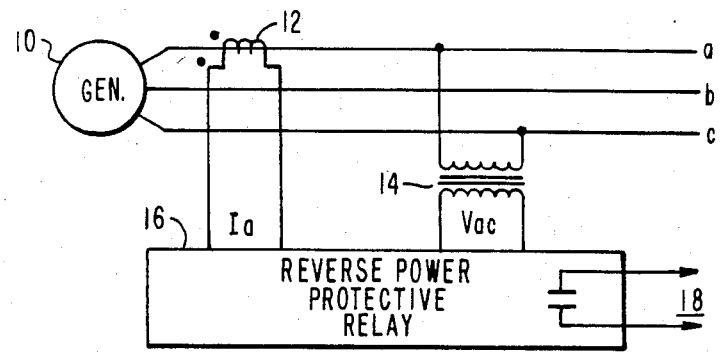
FIG. 1 is an illustrative schematic exemplifying a suitable environment for the application of the present invention.

In FIG. 1, a three-phase alternating current (AC) generator 10 provides energy to a power system network (not shown) at varying power levels over the power lines designated a, b, and c which correspond to the three phases of the generator 10. Conventionally, a current transformer 12 is coupled to one of the power line phases in close proximity to the generator 10 for measuring the current in the one phase, say a, for example, and generating a signal Ia representative thereof. Similarly, a voltage transformer 14 may be coupled across two phases, say a and c, for example, of the three power lines in close proximity to the generator 10 for measuring the phase-to-phase voltage thereacross. The voltage transformer 14 generates a signal Vac which is representative of a voltage at the output of the AC generator having a phase relationship with the current signal Ia. The signals Ia and Vac are received by a reverse power protective relay 16 and processed therein for detecting a reverse power condition of the generator 10. A signal 18, which may be in the form of a contact closure, is provided as an indication that the detected reverse power is of a sufficient amplitude to cause generator motoring and some action to prevent the anti-motoring condition should commence.

Figure 2:
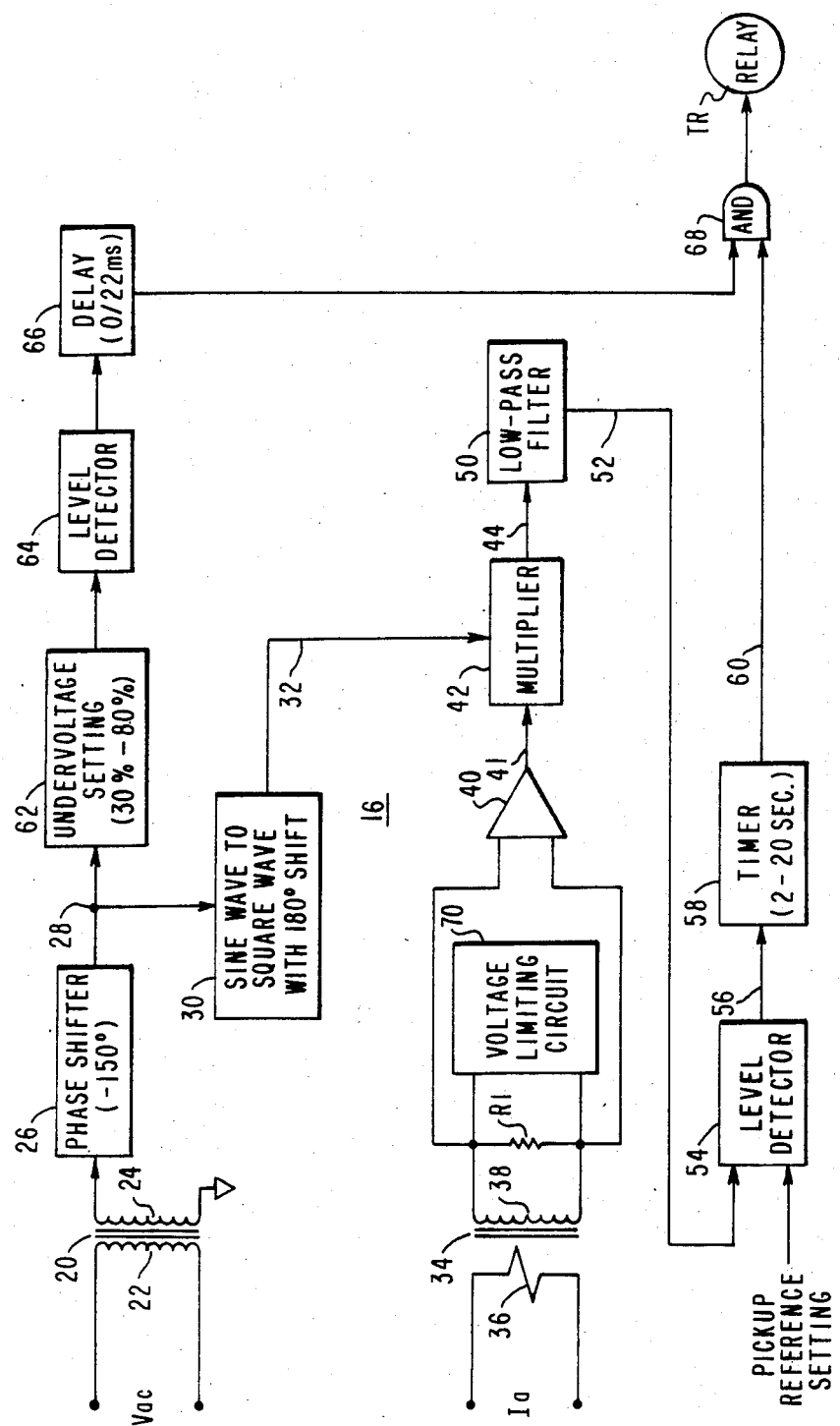
FIG. 2 is a functional block diagram schematic of an electronic protective relay suitable for embodying the principles of the present invention.

Referring to FIG. 2, the voltage signal Vac is received by the protective relay 16 utilizing a conventional voltage transformer 20. The signal Vac is coupled across the primary coil 22 of the transformer 20 and thus electromagnetically couples a signal representative thereof across the secondary coil 24. One end of the secondary coil 24 may be coupled to the common potential of the relay 16 and the other end may be coupled to a phase shifter circuit 26 which in the present embodiment is designed to shift the phase of the voltage representative signal 150 degrees in one direction of time, which may be the lagging direction, for example. The phase shifted signal 28, which is substantially a sine wave, is provided to a circuit 30 which converts the signal 28 into a square waveform with an inversion in polarity. The operation of circuit 30 effectively shifts the signal 28 180 degrees in a time direction opposite that of the phase shift of circuit 26 to yield an overall square waveform signal at 32 which is phase shifted by 30 degrees in the leading direction. The effect of this circuit is to provide the maximum sensitivity phase angle at Ia leading Vac by 30 degrees.

Similarly, the current signal Ia is received by the relay 16 by an auxiliary current transformer 34 which for the present embodiment may be made of Hi-mu laminations and have a turns ratio of approximately 20 to 400, for example. The signal Ia may be coupled to the primary coil 36 to impose electromagnetically a corresponding current signal at the secondary coil 38 in accordance with the turns ratio of the transformer 34. A resistor R1 is coupled across the secondary coil 38 to convert the current thereof into a potential. For the present embodiment, for a one milliamp RMS primary current, the voltage across the resistor R1 is designed to be 10 mV RMS. The voltage potential across R1 which represents the current signal Ia is provided to a conventional differential amplifier circuit 40 to effect a current representative signal 41 which is essentially sinusoidal in shape.

Figure 3:
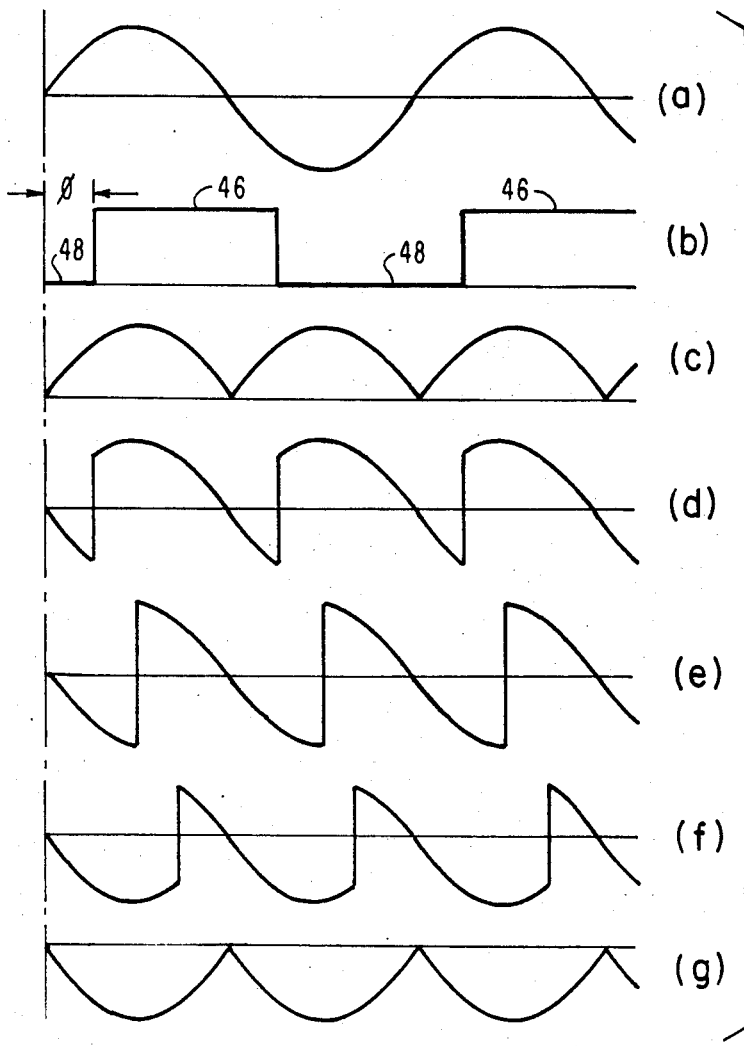
FIG. 3 including waveforms a-g illustrates the operation of a phase rectified multiplier suitable for embodiment in the relay depicted in FIG. 2.

The two signals 32 and 41 are multiplied in the multiplier circuit 42 to effect a product signal 44 having a zero frequency or DC component and a multiplicity of other components having frequencies harmonically related. An operation of the multiplier 42 will be described in connection with the waveforms a through g of FIG. 3. Referring to FIG. 3, waveform a is illustrative of the sinusoidal current signal 41 and waveform b is illustrative of the phase shifted square waveform voltage signal 32. The multiplication effects of the multiplier unit 42 with varying phase angles $\phi$ between the current signal 41 and phase shifted voltage signal 32 are shown by the waveforms c through g.

The multiplication operation of voltage signal 32 on current signal 41 is such that the current signal 41 passes with no change in polarity when the waveform 32 is in a first digital state and passes with inverted polarity when the waveform 32 is in a second digital state. As shown by the waveform b, the first digital states are illustrated at portions 46 and the second digital states are illustrated at portions 48. Thus, with a zero degrees phase angle $\phi$, the signal 41 is full-wave rectified by the signal states of signal 32 as illustratively depicted in the waveform c. The waveforms d through g illustrate the multiplicative effects as the phase angle $\phi$ changes from 45 to 90 to 135 to 180 degrees, respectively. It is readily recognized that the DC component of the resultant product signal changes through the waveforms c-g from a max positive amplitude to zero to a max negative amplitude. Accordingly, reverse power is detected when the phase angle $\phi$ is between $+90$ degrees and $+270$ $(-90)$ degrees where the DC component of the multiplication product signal 44 is negative in value.

Referring back to FIG. 2, the product signal 44 is passed through a low-pass filter circuit 50 to separate out substantially a DC component signal 52 which is indicative of the real power of the AC generator. The separated DC component signal 52 is thereafter provided to a level detector circuit 54 wherein it is compared with a pickup reference setting which may be varied from 0.02% to 0.8% per unit of representative real power signal to establish if the reverse power signal measurement is of the reverse power polarity and above a threshold limit to cause generator motoring. If this condition exists, the level detector circuit 54 generates a signal 56 as an indication thereof. A timer 58 is responsive to the signal 56 to determine the sustaining time thereof. In the present embodiment, the timer may be set from 2 to 20 seconds. Should the signal 56 persist beyond the preset time interval of the timer 58, a trip signal 60 is generated as a generator motoring prevention indication.

In addition to the above-mentioned circuits, the relay 16 may further include undervoltage detection circuitry to inhibit the generated trip signal 60 from signaling peripheral anti-motoring apparatus. The undervoltage detection circuitry includes an undervoltage setting at 62 which operates on the phase shifted signal 28 with a setting which may be varied between 30% to 80% in the present embodiment. The output of circuit 62 is provided to a level detector circuit 64 for determining an undervoltage condition therefrom. The undervoltage signaling from the level detector 64 may be delayed by a timer 66 prior to being provided to one input of an AND gate 68 with the trip signal 60 provided to another input thereof. The trip signal 60 is passed by the AND gate 68 for energizing a relay TR, for example, when the voltage signal 28 is above the setting of the circuit 62. However, during an undervoltage condition which is indicated by the undervoltage signal supplied to the AND gate 68 from the delay circuit 66, the trip signal is inhibited from passage through the AND gate 68.

In addition, it is understood that during normal generator operation, the current levels being measured by the transformer 34 in the forward direction may, at times, be as high as fifteen times the rated value of the transformer 34. This overcurrent condition causes very large voltage excursions across the resistor R1, such voltage being applied across the secondary coil of transformer 34 and to the input of the amplifier 40. In order to prevent current transformer saturation and protect the circuitry of the input stage of the amplifier 40, a voltage limiting circuit 70 is disposed across the resistor R1 to effect a voltage limit when such overcurrent conditions occur.

Figure 4:
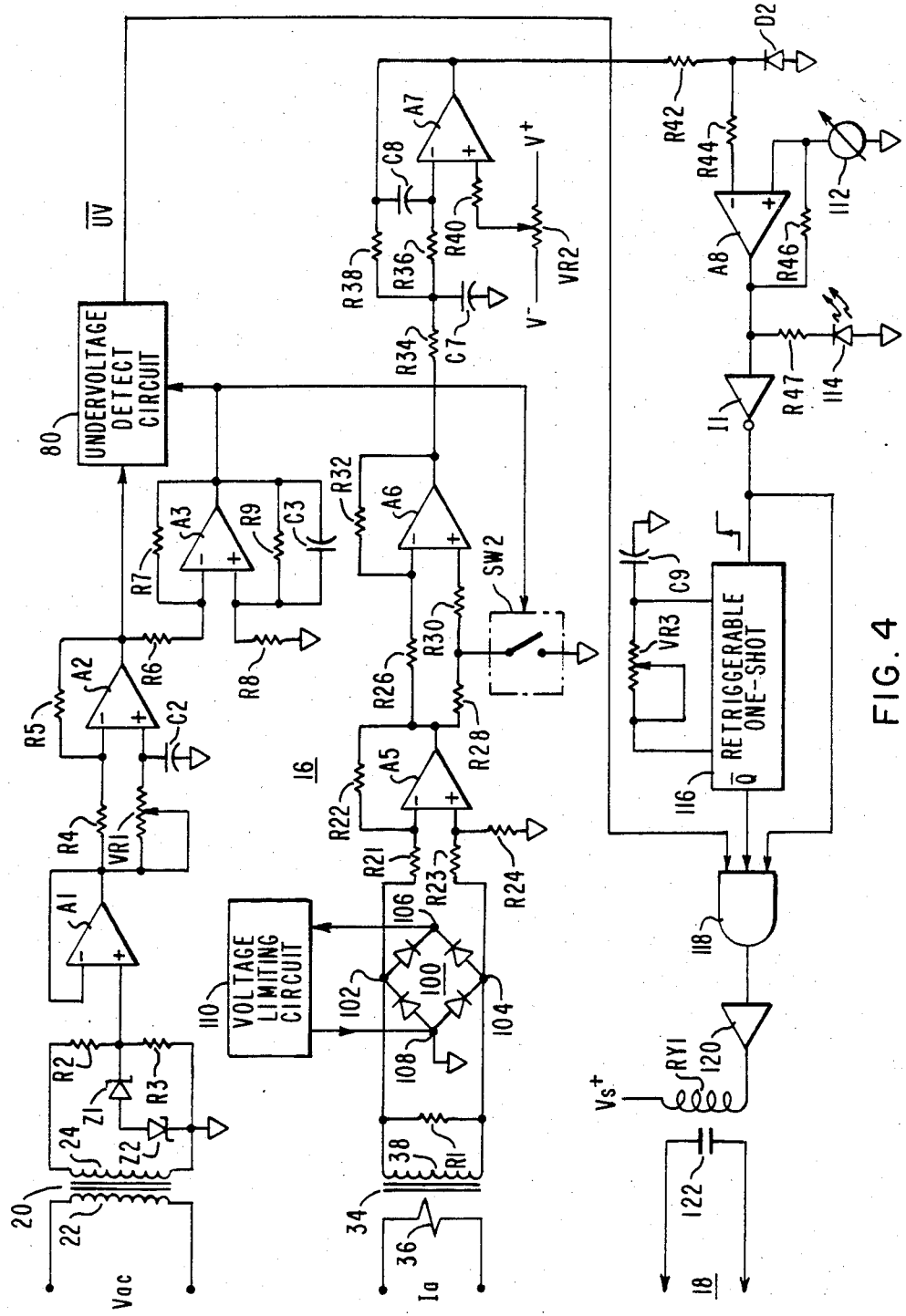
FIG. 4 is a circuit schematic diagram depicting an electronic relay similar to the embodiment shown in FIG. 2.

The embodiment described in connection with FIG. 2 is shown in more specific detail in the circuit schematic diagram of FIG. 4. Referring to FIG. 4, the secondary coil 24 of the transformer 20 is coupled across a resistor divider network R2 and R3 to reduce the secondary potential thereof. The voltage across R3 is limited by the back-to-back series connection of Zener diodes Z1 and Z2 coupled across resistor R3. The R3 side of the secondary coil 24 is coupled to the common potential of the relay 16. The effects of the aforementioned circuitry is to reduce the voltage by the divider network R2 and R3. The resulting voltage signal is buffered by an operational amplifier A1 and thereafter supplied to a differential amplifier configuration.

More specifically, the output of A1 is conducted through a resistor R4 to the inverting (−) input of an operational amplifier A2 which (−) input is coupled to the output of A2 through a feedback resistor R5. In addition, the output of A1 is also supplied to the non-inverting (+) input of A2 through a variable resistor VR1. The (+) input of A2 is further coupled to the relay's common potential through a capacitor C2. In operation, the differential amplifier circuit of A2 operates to produce a phase shift of −150° as shown by the circuit 26 of FIG. 2.

The resulting signal output of A2 is coupled to an inverting amplifier configuration comprising an operational amplifier A3 and resistors R6 and R7 as the (−) input resistance and feedback resistance, respectively. The (+) input of A3 is coupled to ground through a resistor R8. In the present embodiment, the resistor R7 is chosen at a value substantially greater than the resistor R6 to effect high closed loop gain which produces a square waveform at the output of A3 which waveform being inverse in polarity to the (−) input signal thereof. A parallel combination of resistor R9 and capacitor C3 are coupled across the (+) input and output of A3 to provide ample hysteresis to the high gain squaring operations of the amplifier A3. Both of the outputs of A2 and A3 are provided to an undervoltage detect circuit 80 which generates a signal $\overline{UV}$ in a first state under normal voltage operating conditions and in a second state during undervoltage conditions. A more detailed circuit diagram of a suitable undervoltage detect circuit is shown in FIG. 5.

Figure 5:
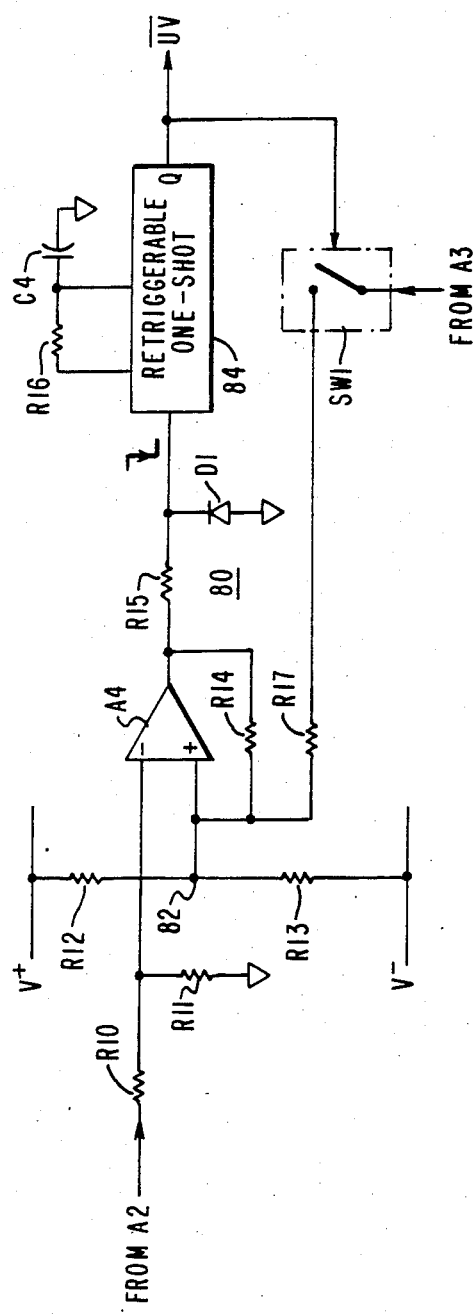
FIG. 5 is a circuit schematic diagram of an undervoltage detect circuit suitable for use in the embodiments of FIGS. 2 and 4.

Referring to FIG. 5, the output signal from A2 representative of the voltage signal is coupled to a resistor divider network R10 and R11 which is used to effect an undervoltage setting as described in connection with the circuit 62 of FIG. 2. The connection point between R10 and R11 is coupled to the (−) input of an operational amplifier A4. Another resistor divider network comprising resistors R12 and R13 is coupled between a positive voltage supply V+ and a negative voltage supply V− to effect a quiescent reference voltage level at the connecting point 82 of the resistors R12 and R3 which quiescent reference voltage is provided to the (+) input of the amplifier A4 to be compared with the voltage signal from the resistor network R10 and R11. Another resistor R14 is coupled between the (+) input and output of the amplifier A4 to alter the reference voltage at the (+) input commensurate in polarity to the output of A4. Moreover, the output of A4 is coupled to a falling edge-triggered input of a retriggerable one-shot circuit 84 through another resistor R15 with said input being coupled to common potential through a diode D1, cathode-to-anode. The time interval of the one-shot circuit 84 is preset by the resistor capacitor network of R16 and C4 conventionally coupled to the one-shot circuit 84. The non-inverted or Q output of the one-shot circuit 84 provides the non-undervoltage signal $\overline{UV}$. Still further, the output signal from the amplifier A3 is coupled through an electronic switch SW1 and a resistor R17 to the (+) input of the amplifier A4. The operation of the switch SW1 is governed by the signal $\overline{UV}$. The output signal from A3 contributes further hysteresis for altering the reference signal at the (+) input of the amplifier A4 when the switch SW1 is in the closed position.

Typical operations of the undervoltage detect circuit 80 as described in connection with the embodiment of FIG. 5 will be explained using the waveforms a through f of FIG. 6. The continuous sinusoidal-shaped waveform 86 of FIG. 6a is illustrative of the signal applied to the (−) input of the amplifier A4, i.e. having gone through the setting process of the resistor divider network R10 and R11. The squared waveform 88 of 6a is illustrative of the alternating reference voltage levels at the (+) input to the amplifier A4. In the present embodiment, the reference potential may be alternating about the common potential level by +2 volts and −2 volts, for example, which amplitude levels representing the undervoltage settings. As long as the amplitude of waveform 86 is greater than the alternating reference potential, the resulting output of amplifier A4 as depicted in waveform b will continue to alternate between polarity states V+ and V− which causes the reference voltage at the (+) input of the amplifier A4 to continue to alternate commensurately therewith. For example, as the waveform 86 exceeds the positive polarity reference voltage at 90 in FIG. 6a, the output of A4 is conducted to the negative polarity state thus causing the reference voltage 88 to fall to its negative polarity reference value. Again, at point 92 when the waveform 86 falls below the negative polarity reference value of 88, the output of A4 is conducted to its positive potential state causing the reference voltage 88 to revert back to its positive potential reference value.

Accordingly, the one-shot 84 is retriggered with each falling edge of the output signal of A4 as denoted by the arrowed lines in the waveform b. The output signal $\overline{UV}$ (see waveform c) is thus sustained at a high state during the generation of these falling edges. But, when the amplitude of the voltage signal 86 falls below the set value which is indicative of an undervoltage condition, it remains within the window of the positive and negative reference values. This eventuality is depicted in the waveform 6a starting at point 94. While the amplitude remains within the reference window, the output of A4 and the reference value are sustained in a fixed state and the generation of the falling edges is discontinued. In the particular embodiment, the one-shot 84 is set to have a time interval of 22 milliseconds which means that if not retriggered within the time interval, its Q output will fall to a low state as shown in the waveform c at point 96. A low state of the signal $\overline{UV}$ is indicative of an undervoltage condition.

The remaining waveforms d through f of FIG. 6 illustrate the operation of the undervoltage detect circuit when the undervoltage condition is alleviated. Upon alleviation, the amplitude of the signal 86 exceeds the reference voltage level 88 as shown at point 98 in waveform d causing the output of the amplifier A4 to generate a falling edge which immediately triggers the one-shot 84 and renders a low-to-high state change at the Q output thereof as depicted by the waveforms e and f, respectively. If the amplitude of the signal 86 remains above the set reference potentials of 88, the amplifier A4 will continue to generate falling edges (arrowed lines) to retrigger the one-shot 84 periodically and maintain its Q output at a high level which is indicative of a non-undervoltage condition.

Returning now to the current signal Ia receiving circuitry in FIG. 4 and more specifically, to the resistor R1 coupled across the secondary 38 of the current transformer 34. In addition, a full-wave rectifying diode bridge 100 has its input terminals 102 and 104 coupled in parallel across the resistor R1. Rectifying terminals 106 and 108 of the bridge 100 are coupled to a voltage limiting circuit 110. The terminal 108 is coupled to a common potential.

Figure 7:
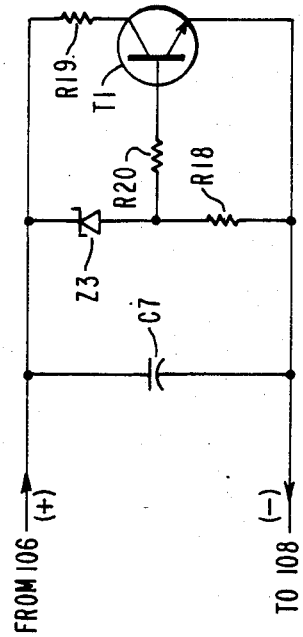
FIG. 7 is a circuit schematic diagram of a voltage limiting circuit suitable for use in the embodiments of FIGS. 2 and 4.

A suitable embodiment for the voltage limiting circuit 110 is shown in the schematic diagram of FIG. 7. Referring to FIG. 7, a capacitor C7 is coupled across the terminals 106 and 108 in parallel with a series combination of a Zener diode Z3 and a resistor R18. A transistor T1 has its emitter coupled to the terminal 108 and its collector coupled to the terminal 106 through a current limiting resistor R19. The transistor T1 is base driven through a resistor R20 from the series connection point between Zener Z3 and resistor R18. In operation, the terminal potential of 106 is always positive (+) with respect to the potential (−) of terminal 108 due to the rectifying behavior of the diode bridge 100. As the input current signal Ia increases above 0.5A (RMS), for example, the resulting voltage across resistor R1 causes the Zener Z3 to begin conducting which, in turn, drives the transistor T1 into conduction. Under these conditions, the circuit 110 becomes a current sink to maintain a substantially fixed peak-to-peak voltage across terminals 106 and 108, i.e. the voltage across terminals 106 and 108 is limited to a predetermined level to avoid current transformer saturation.

Continuing, the resistor R1 is also coupled to a differential amplifier comprising an operational amplifier A5. The terminal 102 end of R1 is coupled to the (−) input of A5 through resistor R21 and the (−) input is coupled to the output of A5 through a resistor R22. Also, the terminal 104 end of R1 is coupled to the (+) input of A5 through resistor R23 and the (+) input is coupled to common potential through another resistor R24. The output of the amplifier A5 is a voltage signal which is proportional to the input current signal Ia from about 1 ma to 500 ma and clamped by the limiting circuit thereabove. However, the phase relationship $\phi$ between the voltage and current signals is maintained for input current signal values from 1 ma to 75 amperes, for example.

Next, the multiplier circuit 42 (see FIG. 2) is configured about an operational amplifier A6. One input of the multiplier circuit 42 is the signal output of A5 which is coupled to both the (−) input of A6 through resistor R26 and to the (+) input of A6 through the series connection of resistors R28 and R30. A feedback resistor R32 is coupled between the (−) input and output of the amplifier A6. An electronic switch SW2 is coupled between the series connection point of R28 and R30 and common potential. Switch SW2 is governed by the signal output of amplifier A3 which is the phase shifted square waveform of the voltage signal. In operation, when the switch SW2 is governed to the closed position, the amplifier circuit of A6 inverts the signal output of A5. When the switch SW2 is operated in the open position, A6 passes the signal output of A5 uninverted. Thus, the output waveforms of A6 appear much as shown by the waveforms c through g of FIG. 3 depending on the phase angle $\phi$ relationship between the voltage and current input signals.

Next, the phase-rectified or product signal of A6 is provided to a two-pole, low-pass filter including an operational amplifier A7. The output signal of A6 is coupled to the (−) input of A7 through a series connection of resistors R34 and R36. The connecting point between R34 and R36 is coupled to both the common potential through a capacitor C7 and the output of A7 through a resistor R38. In addition, the (−) input of A7 is coupled to its output through a capacitor C8. A zero offset adjustment circuit is provided by coupling the (+) input of A7 to a variable potentiometer VR2 through another resistor R40. In operation, the two-pole filter circuit of A7 removes substantially the line frequency and its harmonics and passes invertedly and substantially the zero frequency or DC component of the phase rectified output signal of A6. Thus, a signal of positive polarity at the output of A7 is indicative of reverse power flow to the generator.

The real power representative signal of A7 is provided through a series connection of resistors R42 and R44 to the (−) input of an operational amplifier A8 being a constituent of the level detector 54 (see FIG. 2). A settable voltage source 112 generates the pickup reference setting (i.e. sensitivity selection) to the (+) input of the amplifier A8. A resistor R46 is coupled across the (+) input and output of A8 to provide a hysteresis effect. Since the positive polarity of the DC component signal of A7 is the measure of reverse power, the negative polarity thereof is irrelevant to the level detection operation. For this reason, a diode D2 is coupled between the circuit connection of resistors R42 and R44 and common potential to afford a clamp of approximately 0.6 V to the negative polarity signal swing. In addition, a series connection of a resistor R47 and a display indicator 114 which may be a light emitting diode, for example, is coupled between the output of the amplifier A8 and common potential. An inverter I1 ay be disposed at the output of the amplifier A8 to invert the polarity of the output signal thereof.

In operation, when the positive polarity or reverse power signal of A7 exceeds the sensitivity level set by the signal generator 112 which event is indicative of a potential generator motoring condition, the output of the amplifier A8 is conducted to a low state which energizes the display 114 and effects a low-to-high state transition at the output of the inverter 11. Conversely, should the signal level of A7 decrease below the level of the signal generator 112 which event is indicative of a safe condition, the output of amplifier A8 is conducted to a high state which de-energizes the display 92 and effects a high-to-low state transition at the output of the inverter I1.

A timer circuit is embodied with a conventional retriggerable one-shot circuit 116 which is triggered by the low-to-high state transition of the output of the inverter I1. The time interval of the one-shot circuit 116 is adjustable say from 2 to 20 seconds, for example, utilizing the series connection of a variable potentiometer VR3 and a capacitor C9 which are conventionally coupled to the one-shot circuit 116. The $\overline{Q}$ output of the one-shot circuit 116 is coupled to one input of an AND gate 118. Other inputs of the AND gate 118 are coupled to the output of the inverter I1 and to the signal $\overline{UV}$. In operation, when the inverter I1 transfers from a low-to-high state which is indicative of a potential generator motoring condition, the $\overline{Q}$ output of the one-shot circuit 116 is immediately caused to transfer to a low state for the time interval set by VR3 and C9. Thus, the $\overline{Q}$ input of the AND gate 118 disables operation thereof during the aforementioned time interval. Upon expiration of the time interval, the $\overline{Q}$ signal of circuit 116 is conducted to a high state. Accordingly, if the signal $\overline{UV}$ is in a high state, indicating a non-undervoltage condition, concurrent with the low-to-high transition of the $\overline{Q}$ signal and the output of the inverter I1 remains in a high state, indicating a sustained potential motoring condition, then the AND gate 118 is conducted high which energizes a relay RY1 utilizing a conventional relay driver circuit 120. A set of normally opened contacts 122 of the relay RY1 is provided to external peripheral devices which may offer protection against generator motoring. Accordingly, a contact closure of the contacts 122 (signal 8) is an indication that anti-motoring protection is needed.

With regard to the aforementioned circuitry, should a race condition result from the operation thereof, an RC delay circuit, preferably a $\pi$-configuration, may be disposed between the inverter I1 and the AND gate 118. Thus, an output signal transition of inverter I1 is supplied to the AND gate 118 after it operates the one-shot 116.

In summary, the electronic protective relay described in connection with the block diagram and circuit embodiments of FIGS. 2–7 offers an extremely sensitive detection of reverse power. The current input circuitry provides a current representative signal which is proportional to Ia from 1 ma to 500 ma while the ac signal limiting circuit 70 applied across the current transformer secondary prevents current transformer saturation and maintains the phase angle $\phi$ between Vac and Ia for a wide variation of input current, e.g. from 1 ma to 75 amperes. In addition, the phase-sensitive rectifier or multiplier 42 affords a relatively simple, but effective method for detecting the power flow direction of the generator. Moreover, the undervoltage detection circuit operates to disable the relay's motoring indication if the generator's voltage has not yet reached or has dropped below an adjustably undervoltage setting. Still further, the relay circuit includes timers for both the undervoltage and reverse power detection circuits to ensure that their respective conditions persist for a preset time duration in each case before an action is initiated.

What is claimed is:

1. An electronic protective relay for detecting a reverse power condition of a three-phase alternating current (ac) generator for the protection against generator motoring, said electronic relay comprising:

first circuit for receiving a signal representative of the current in one of said phases of said ac generator and for generating a current signal representing said received signal;

second circuit for receiving a signal representative of a voltage at the output of said ac generator and for generating a voltage signal representing said received signal, said voltage signal having a phase relationship with said current signal;

third circuit for phase shifting said voltage signal generated by said second circuit a first predetermined phase angle to effect a first signal representative of said phase shifted voltage signal;

fourth circuit for multiplying said current signal generated by said first circuit with said first signal to generate a second signal having a component representative of the real power of said ac generator;

fifth circuit for separating said real power component from the remainder of said first signal; and sixth circuit for detecting a reverse power condition from said separated signal component and generating a signal indicative of said reverse power condition.

2. The electronic relay in accordance with claim 1 wherein the ac generator produces power over three power lines, each carrying a different phase of said power; wherein the first circuit receives a current representative signal from one phase; and wherein the second circuit receives a signal representative of the voltage across one phase and another phase.

3. The electronic relay in accordance with claim 1 wherein the third circuit includes:

a phase shift circuit for phase shifting the voltage signal a second predetermined phase angle in one direction of time; and another circuit for converting said phase shifted voltage signal into a square waveform and inverting the polarity thereof to effect the first signal which is phase shifted the first predetermined phase angle in a direction of time opposite said one direction.

4. The electronic relay in accordance with claim 1 wherein the fifth circuit includes a low-pass filter circuit for passing substantially a zero frequency component of the second signal, said zero frequency component having a polarity and amplitude; and wherein the sixth circuit includes a level detector circuit for detecting the reverse power condition when said zero frequency component passed by said filter circuit is of a predetermined polarity and greater than a predetermined amplitude.

5. The electronic relay in accordance with claim 1 including a timer circuit for generating a delayed signal if the reverse power condition signal of the sixth circuit is sustained for a predetermined time interval which is initiated by the generation of the reverse power condition signal.

6. The electronic relay in accordance with claim 1 including: an undervoltage detect circuit for detecting an undervoltage condition of the voltage signal and for generating a signal indicative thereof; and a logic circuit for generating a trip signal in response to the reverse power condition signal, said logic circuit being disabled by said undervoltage signal from generating said trip signal.

7. The electronic relay in accordance with claim 6 including a timer circuit, disposed between the sixth circuit and logic circuit, for generating a delayed signal if the reverse power condition signal is sustained for a predetermined time interval which is initiated by the generation of the reverse power condition signal, said logic circuit responsive to said delayed signal to generate said trip signal unless disabled by the undervoltage signal.

8. The electronic relay in accordance with claim 6 wherein the undervoltage detect circuit includes: an ac comparator circuit for monitoring a signal representative of the voltage signal and for generating (1) a pulsed signal of alternating polarity having polarity changing edges inversely commensurate with amplitude excursions of said representative voltage signal beyond a positive polarity reference amplitude and a negative polarity reference amplitude, and (2) a fixed amplitude signal when said amplitude excursions of said representative voltage signal fall within the amplitude window of the positive and negative polarity reference amplitudes; and a retriggerable one-shot circuit governed by a cessation of polarity changing edges of said comparator generated signal (1) to generate the undervoltage signal subsequent to a predetermined time delay from said cessation, the generation of the undervoltage signal being inhibited upon regeneration of said polarity changing edges during said predetermined time delay.

9. The electronic relay in accordance with claim 1 wherein the first circuit includes an amplitude limiting circuit for limiting the amplitude of the current signal to a predetermined amplitude without altering substantially the phase relationship thereof to the voltage signal.

10. The electronic relay in accordance with claim 9 wherein the amplitude limiting circuit includes:
   a diode bridge having an input pair and rectifying pair of opposite ends, the current signal being coupled to said input pair of opposite ends to impose a potential commensurate with the amplitude of the current signal thereacross; and
   a clamping circuit coupled across said rectifying pair of opposite ends to limit the potential across said input pair of opposite ends from exceeding a predetermined voltage potential.

* * * * *